April 28, 1964 J. MAURICE 3,130,828
CLUTCH WITH ELASTIC WASHER
Filed July 24, 1961 5 Sheets-Sheet 2
FIG: 2
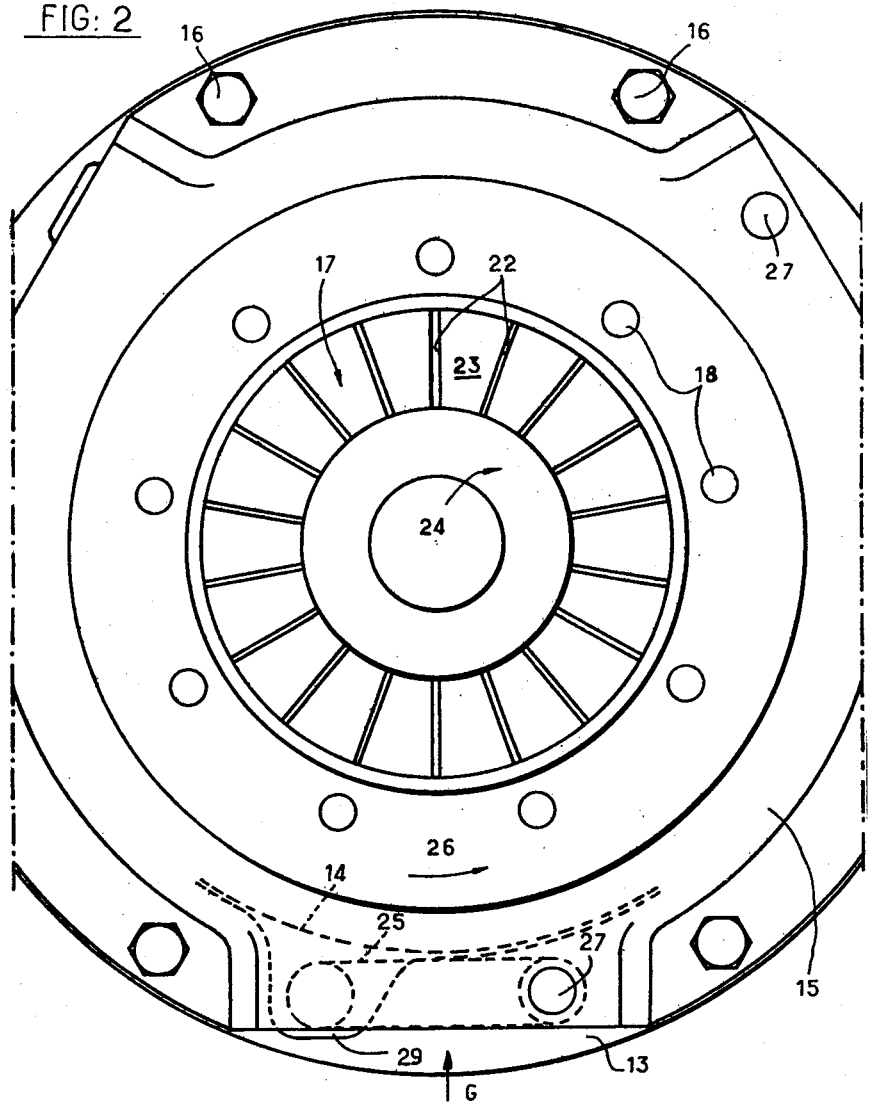
FIG: 3
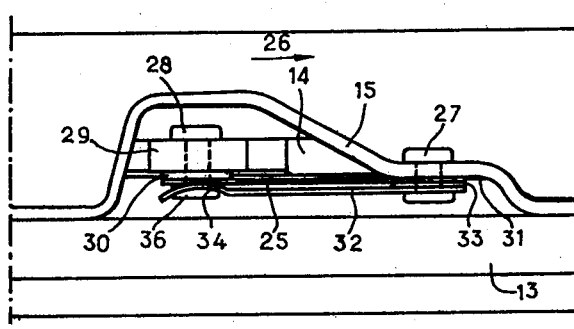
INVENTOR
JEAN MAURICE
By Irwin S. Thompson
ATTY.

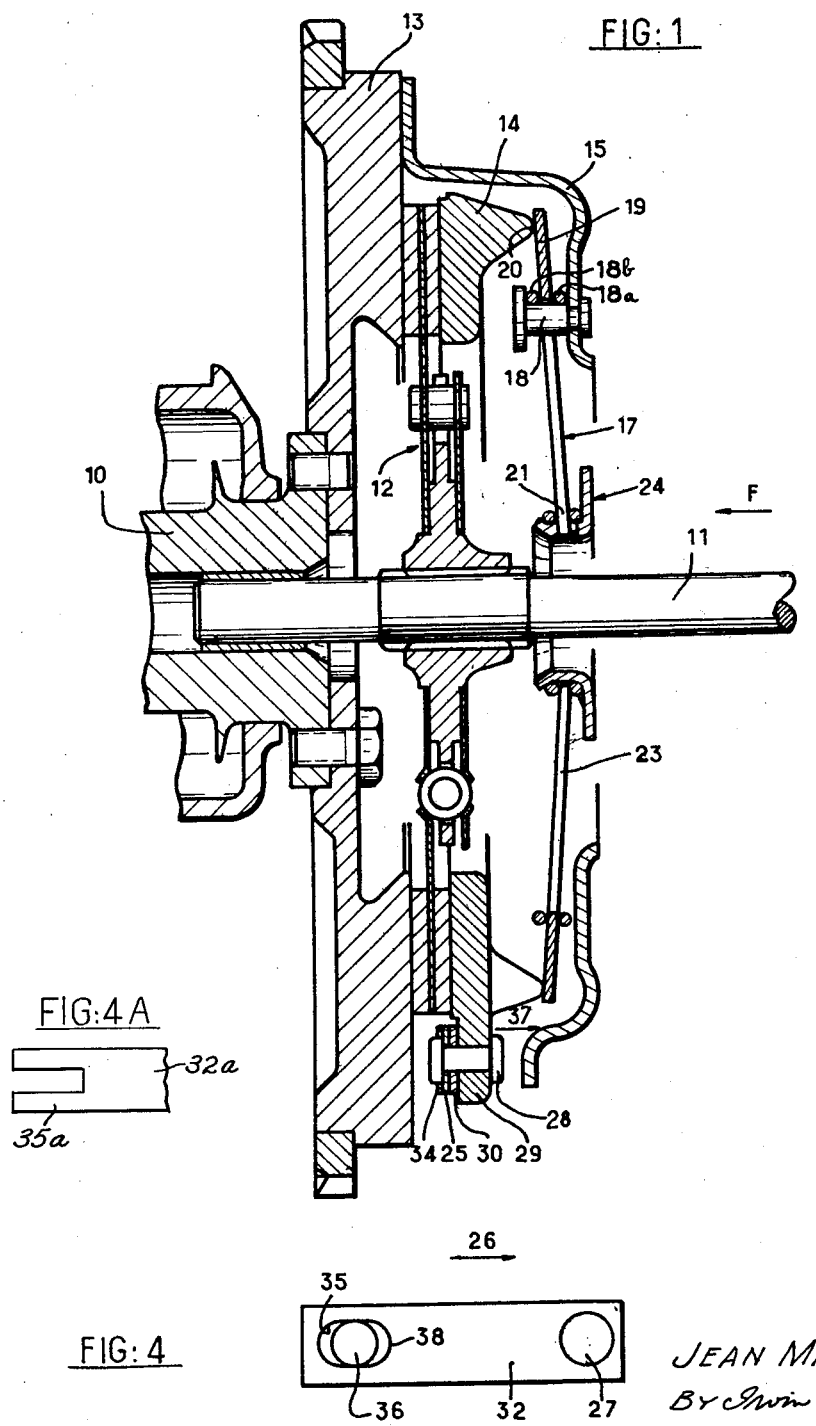
April 28, 1964   J. MAURICE   3,130,828
CLUTCH WITH ELASTIC WASHER
Filed July 24, 1961   5 Sheets-Sheet 1
FIG: 1
FIG: 4A
FIG: 4
INVENTOR
JEAN MAURICE
BY Irwin S. Thompson
ATTY.

INVENTOR
JEAN MAURICE
By Irwin S. Thompson
ATTY.

April 28, 1964     J. MAURICE     3,130,828
CLUTCH WITH ELASTIC WASHER

INVENTOR
JEAN MAURICE
BY Irwin S. Thompson
ATTY.

April 28, 1964 J. MAURICE 3,130,828
CLUTCH WITH ELASTIC WASHER
Filed July 24, 1961 5 Sheets-Sheet 5
FIG.12    FIG.13   FIG.14 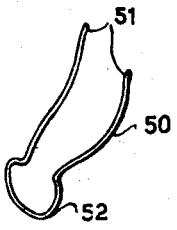   FIG.15
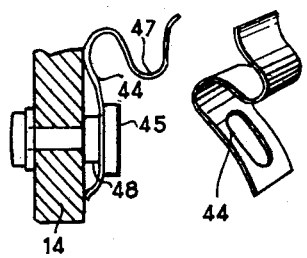
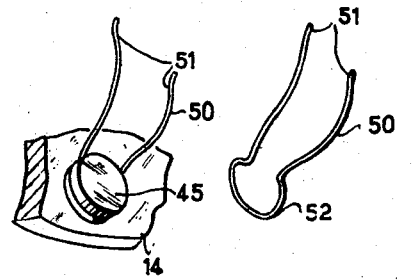
FIG.16   FIG.17   FIG.18
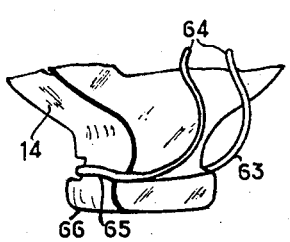
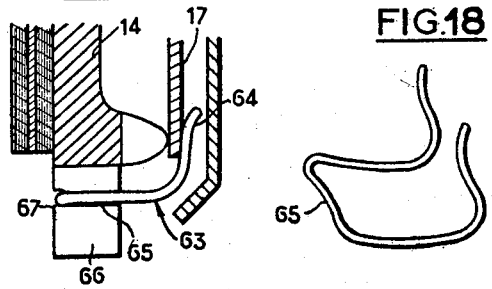
FIG.19   FIG.20
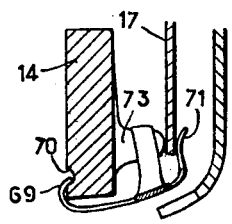   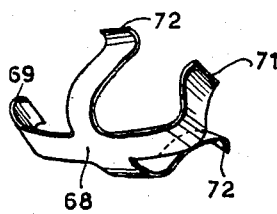
INVENTOR
JEAN MAURICE
BY Irwin S. Thompson
ATTY.

United States Patent Office 3,130,828
Patented Apr. 28, 1964

3,130,828
CLUTCH WITH ELASTIC WASHER
Jean Maurice, Paris, France, assignor to Societe Anonyme Francaise du Ferodo, Paris, France, a corporation of France
Filed July 24, 1961, Ser. No. 126,061
Claims priority, application France Aug. 2, 1960
12 Claims. (Cl. 192—66)

The invention relates to clutches intended to provide the coupling between a driving shaft and a driven shaft. It is more particularly concerned with clutches which comprise at least one friction disc coupled for rotation to the driven shaft and normally gripped between a driving plate keyed on the driving shaft and an annular pressure-plate coupled in rotation to the driving plate and adapted to be displaced axially with respect to the latter in order to liberate the friction disc, an annular closure cover fixed by its periphery to one of the plates and covering the other, and an elastic conical control washer interposed between the cover and one of the plates and pivoted on the said cover at points located on a circle intermediate between the edges of the said washer, the outer edge of the said washer being supported on a plate, while its inner edge, which is provided with radial slots forming between them control fingers, is in engagement with a de-clutching ring capable of axial displacement under the pressure of a de-clutching thrust member actuated by a rod system.

In the engaged position, the outer portion of the washer is supported on the axially-fixed member and ensures the application of the axially-movable pressure-plate on the friction-disc. During the disengagement, the central portion of the washer acts like a plurality of levers which, pivoting about axially-fixed articulation points, ensure the withdrawal of the axially movable portions of the washer and thereby free or withdraw the pressure-plate. Thus, in a clutch of this kind, the elastic washer simultaneously replaces the clutch springs and the de-clutching levers of the conventional type.

This arrangement permits the construction of clutches of small axial dimensions, capable of withstanding very high speeds of rotation, which are less costly to produce than the usual clutches.

However, the practical construction of these elastic washer clutches presents various difficulties, especially as regards the construction of the means ensuring the coupling for rotation of the pressure-plate to the driving plate, while leaving this plate free to be displaced axially for the purposes of de-clutching, and also the construction of means for returning the pressure-plate to the rear in the de-clutched position.

The present invention has for its object an elastic washer clutch which is free from these drawbacks.

In accordance with one of the characteristics of the invention, the pressure-plate is coupled to the fixed plate by the intermediary of the closure cover by at least three flexible coupling tongues directed tangentially and fixed at one of their extremities to the said plate and at their other extremities to the said cover, the extremities of these coupling tongues located at the front with respect to the normal direction of rotation being coupled to the cover, and their rear extremities being connected to the pressure-plate, the said coupling tongues being arranged in practice in the plane of the friction-disc.

In accordance with a further characteristic feature of the invention, one of the two parts to be coupled together by the tongues comprises a single articulation point for the tongues, whereas the other part comprises two possible points of attachment, these two fixing points being advantageously symmetrical with each other with respect to a plane passing through the axis and the common point of articulation, so as to permit during assembly the orientation of the play of the tongues having regard to the direction of rotation of the engine.

In accordance with a further characteristic feature, a coupling between the washer and the clamping plate in the vicinity of this latter, to provide the positive return to the rear of this plate when the periphery of the washer is withdrawn at the moment of de-clutching, is provided separate and distinct from the coupling by the tongues.

Forms of embodiment of the invention are described below by way of example, reference being made to the accompanying drawings, in which:

FIG. 1 represents in axial cross-section, a clutch with an elastic washer to which the present invention is applied;

FIG. 2 shows this clutch in elevation looking in the direction of the arrow F of FIG. 1;

FIG. 3 is a side view taken in the direction of the arrow G of FIG. 2, of one of the coupling members between the pressure-plate and the closure cover;

FIG. 4 shows one of the auxiliary tongues arranged between the pressure-plate and the closure cover;

FIG. 4A shows a slight modification of one end of a tongue;

Figure 6:
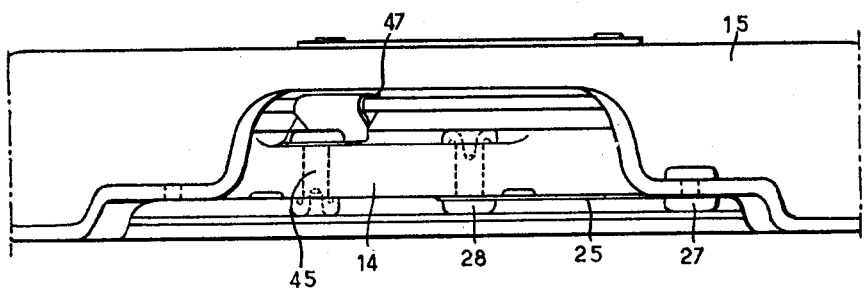
Figure 7:
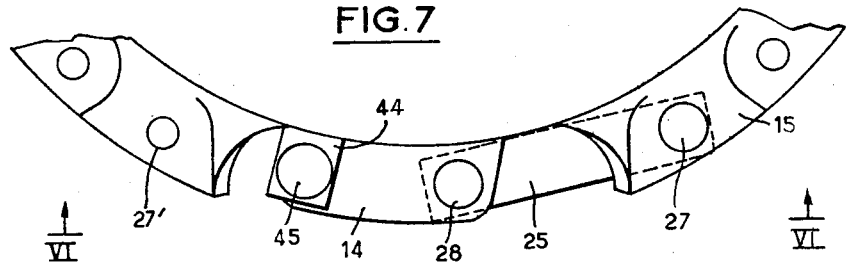
Figure 8:
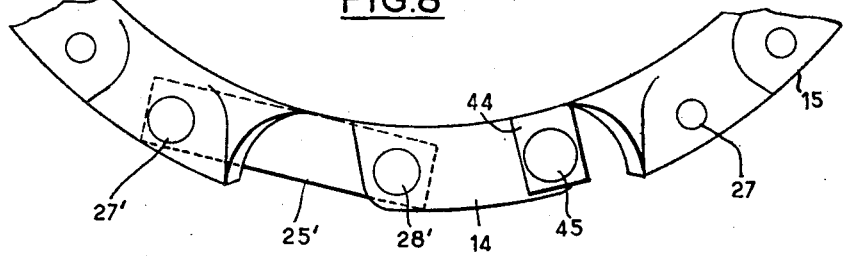
Figure 9:
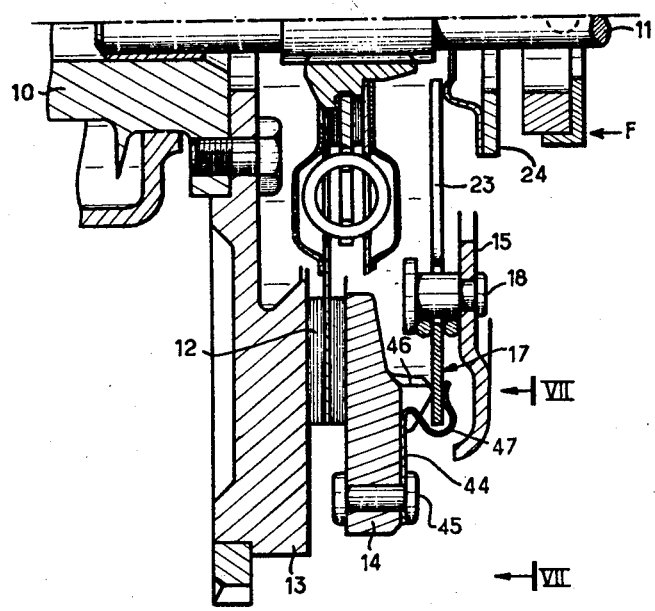
Figure 10:
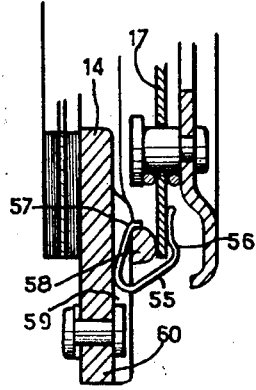
Figure 11:
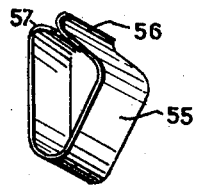

FIG. 6 relates to a further alternative form of assembly shown looking in the direction of the arrows VI—VI of FIG. 7;

FIG. 7 is a view of this further alternative looking in the direction of the arrows VII—VII of FIG. 9;

FIG. 8 is a view similar to FIG. 7, but in which the assembly is modified so as to be adapted to rotation of the driving portion in the opposite direction;

FIG. 9 is a lower half-view in longitudinal cross-section of the clutch provided with the device of FIGS. 6 to 8, and also with a device for returning the pressure-plate to the rear in the de-clutched position;

FIG. 10 is a partial view of an alternative form of this device;

FIG. 11 is a view in perspective of a portion of this alternative form;

FIG. 12 is a view of another alternative form of the device for returning the pressure-plate to the rear in the de-clutched position;

FIG. 13 is a view in perspective of the blade only of the device of FIG. 12;

FIG. 14 is a perspective view of a further alternative form of the device for returning the pressure-plate to the rear;

FIG. 15 is a perspective view of the piano wire only of the device of FIG. 14;

FIG. 16 is a perspective view of another alternative form of the device for returning the pressure-plate to the rear;

FIG. 17 is a side view of the device shown in FIG. 16;

FIG. 18 is a view in perspective of the rod only of the device of FIGS. 16 and 17;

FIG. 19 is a side view of another alternative form of the device for returning the pressure-plate to the rear;

FIG. 20 is a perspective view of this latter device.

In accordance with FIGS. 1 and 2, an elastic washer clutch is applied to the coupling of a driving shaft 10 to a driven shaft 11.

This clutch comprises, in known manner, a friction-disc 12 coupled for rotation to the driven shaft 11 and normally gripped between a fly-wheel plate 13 keyed on the driving shaft 10 and an annular pressure-plate 14 coupled for rotation to the fly-wheel plate 13 and capable of being axially displaced with respect to this latter in order to free the friction-disc and complete the de-clutching operation. An annular closure cover 15, fixed at its periphery by bolts 16 (FIG. 2) to the fly-wheel plate 13, covers the pressure-plate 14. An elastic control washer 17, interposed between the cover 15 and the pressure-plate 14, is pivoted on the cover 15 by keeper rings 18a and 18b, centered at points 18 located on a circuit intermediate between the edges of this washer. The outer edge 19 of this washer is supported at 20 on the pressure-plate, while its inner edge 21, which is provided with radial slots 22 forming between them control fingers 23 (FIG. 2), is in engagement with a de-clutching ring 24 surrounding the driven shaft 11. This ring is capable of axial displacement under the pressure of a de-clutching thrust-member (not shown) which is actuated by a link-rod system.

In the engaged position (FIG. 1), the outer portion of the washer 17 is supported on the ring 18a on the cover 15 and ensures the elastic application of the pressure-plate 14 against the friction-disc 12, whereas during the de-clutching, the elastic fingers 23 of the washer act as levers which, pivoting about the articulations 18b, ensure the withdrawal of the outer edge 19 of the washer, thus causing the liberation or eventually the withdrawal of the pressure-plate 14.

It will be observed that the fly-wheel plate 13, the cover 15, the pressure-plate 14, the washer 17 and the de-clutching ring 24 are driven in rotation with the driving shaft 10.

An important characteristic of the invention relates to the means for ensuring the drive in rotation of the pressure-plate 14 with the driving shaft, while permitting this pressure-plate however to move axially for the purpose of de-clutching. According to the invention (FIGS. 1 to 4), the pressure-plate 14 is coupled to that end to the closure cover 15 by three equi-distant tongues 25, arranged tangentially. The extremities of these tongues located in front with respect to the normal direction of rotation of the driving shaft (arrows 26) is fixed to the closure cover 15 by a rivet 27, while their rear extremity is fixed by a rivet 28 to a radial foot 29 of the pressure-plate 14. Each tongue 25 is arranged practically in the plane of the friction-disc 12 in order to avoid the phenomena of chatter; for this purpose, it is fixed to the plate 14 on that side of the plate which is intended to come into contact with the disc 12 (FIG. 1), and is spaced apart from this plate 14 by a washer 30 of suitable thickness. It is fixed to the cover 15 on a bearing surface 31 formed transversely to the axis of rotation, substantially in the plane of the friction-disc (FIG. 3).

As can especially be seen from FIG. 3, each coupling tongue 25 is duplicated by an auxiliary elastic tongue 32, the front extremity of which is rigidly imprisoned under the inner head of the rivet 27, and is applied against the main tongue 25 with the interposition of a washer 33, whereas its rear extremity is free and comprises a bent portion 34 applied against the tongue 25 and having a recessed portion 35 into which the head 36 of the rivet 28 passes freely. This recess 35 may be constituted by an elongated orifice as shown in FIG. 4, but may also take the form of a notch as shown in FIG. 4A formed at the end of the tongue 32a and thus forming a fork, the limbs or extensions 35a of which are arranged on each side of the head 36 of the rivet 28.

As will be understood, the coupling produced by the three tangential tongues 25 ensures correct centering of the pressure plate 14, and also its drive in rotation from the cover 15, while permitting the plate 14 the freedom of axial displacement for de-clutching.

It will be noted that the arrangement of the tongues 25 enables them to work in tension during normal working, which reduces the risk of buckling. In addition, their arrangement in the plane of the friction-disc enables chattering to be prevented.

The auxiliary elastic tongues 32 have several functions: they co-operate in de-clutching by playing the part of axial restoring springs for moving away from the pressure-plate 14 (arrow 37 of FIG. 1); they participate in the resistance of the tongues 25 to buckling during reverse running, since the front edge 38 of the recess 35 (FIG. 4) forms an abutment for the head 36 of the rivet 28; in addition, in the case where their recess 35 is constituted by an elongated orifice (FIG. 4), they can serve as safety driving tongues in the event of accidental breakage of one of the main tongues 25. It will be noted that by reason of the fact that the rear portion of the tongues 32 or 32a is engaged on each side of the head 36, they are retained against the displacing effect of centrifugal force.

As has been indicated above, the tangential tongues 25 are orientated in such manner as to prevent them working by buckling.

Figure 5:
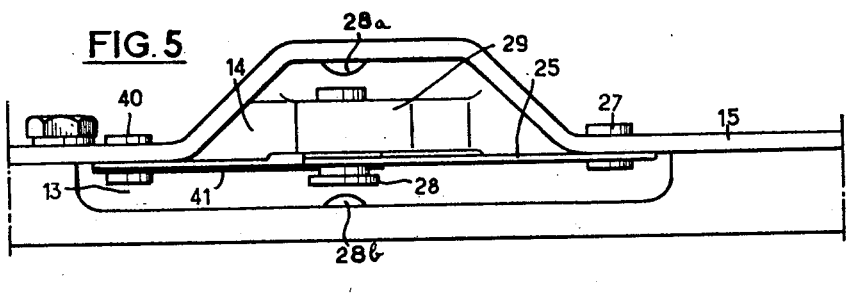
FIG. 5 is a view similar to FIG. 3, but relating to an alternative form of assembly, in which two sets of tongues, orientated in opposite directions, are provided.

In the alternative form shown in FIG. 5, in order to permit the adaptation of the clutch to various vehicles, irrespective of the direction of rotation of the driving shaft, and without having to modify the structure of the clutch, provision has been made at the manufacturing stage to provide the cover 15 with a second set of holes, the axis 40 of which is symmetrical with that of the holes in which are placed the rivets 27 with respect to the axis of the rivet 28 which fixes the other extremity of the tongue 25 on the plate 14. During the assembly of a given series of clutches, it is therefore possible to reverse the direction of the tongues which will normally work under tension when the clutch is mounted on a shaft rotating in the opposite direction to that usually employed.

By utilizing for that purpose the hole having the axis 40, there is preferably installed during assembly a second set of tongues 41 (FIG. 5) which are directed in the opposite sense and thus work in tension when running in reverse.

They are then substituted for the coupling with the tongues 25 and thereby prevent the latter being buckled. It will be noted that in this case the tongues 41 should be given at one of their extremities, preferably at their connection at 28 to the plate 14, a slight play about the rivet, so as not to prevent the movement of the plate 14 with respect to the assembly of the cover 15 and plate 13. In addition, abutments 28a and 28b limit the travel of the tongue 41 in a direction parallel to the axis of the clutch.

Reference will now be made to FIGS. 6 to 9, in which the arrangement is similar to those which have been previously described, and in which the tongues 25 may be orientated at will, depending on the direction of rotation of the engine, while means are provided to cause the recoil of the pressure-plate 14 in the de-clutched position.

In the example shown in FIGS. 6 to 9, these means consist of thin blades 44, which are each fixed to the plate 14 by a rivet 45 distinct from the rivet 28. The extremity of each blade 44 has the form of a handle 47, in which is engaged the periphery of the washer 17. At the point of the blade 44, the plate 14 is provided with ventilation passages 46 which have the additional effect of preventing the pivotal movement of the blade 44.

In the engaged position, the periphery of the washer 17 is deflected towards the plate 14 so as to serve the purpose of a spring, and the plate 14 grips the disc 12 without putting the blade 44 under any appreciable tension.

When the de-clutching ring 24 pushes the levers 23, the washer 17 applies no further elastic action on the plate 14 and on the contrary, its periphery moves backwards. In so doing, it displaces the plate 14 by means of the blades 44 and thus ensures a disengaging movement of the disc 12 which facilitates a complete and total disengagement of the clutch.

It will be appreciated that the arrangement of two rivets or other separate attachment means 28 and 45, one applied solely to the coupling of the tongues 25 and the other applied only to the coupling of the recoil blades 44, permits the clutch to be conveniently adapted to conditions of working in which the engine may rotate in one direction or in the other, indifferently.

FIGS. 6 and 7 show the arrangement of the tongues and rivets in the case of a rotation of the engine in one direction. There is shown in FIG. 8 the adaptation in the case of a rotation in the opposite direction: the driving tongue 25' of the plate 14 is coupled to the latter by a rivet 28' which takes the place of the rivet 45 of FIG. 7, while the blade 44 is fixed to the plate 14 by a rivet 45' which takes the place of the rivet 28 of FIG. 7.

It will of course be understood that irrespective of the direction of rotation of the engine, it is possible, as shown in FIG. 5, to associate with the main tongues 25 or 25' working under tension in the forward direction of running, an additional set of tongues fixed on the plate at 28 and 28' and on the cover at the point 27' in the case of FIG. 7, and 27 in the case of FIG. 8. This set of additional tongues works in tension in the reverse direction of rotation. The freedom of displacement of the plate 14 is ensured either by play in certain articulations or by bending certain tongues, or by deformability of the support.

In the alternative form shown in FIGS. 10 and 11, the device for moving the plate 14 back in the de-clutched position comprises a clip 55 having one limb 56 engaged behind the the washer 17 while the other limb 57 is supported on a bead 58 rigidly fixed on the plate 14, and under which is formed a passage 59 to receive the clip 55. More particularly, the bead 58 may be cast integrally with the plate 14 at the same time as a boss serving to attach the driving tongues, in which boss is cast a groove forming the passage 59 to prevent pivotal movement of the clip 55. As an alternative, the clip 55 could be hooked on a keeper-ring supported in a groove formed on the inner face of the bead 58 provided on the plate 14, thus simplifying the casting of the said plate.

In the alternative form shown in FIGS. 12 and 13, the arrangement is similar to that of FIG. 9, but instead of the blade 44 being applied in continuous contact against the plate 14, the blade is bent and is fixed against a shoulder 48 inserted between the plate 14 and the head of the rivet 45.

In a further alternative form (FIGS. 14 and 15), the blade 44 is replaced by a piano wire 50 having two branches 51 intended to be engaged behind the washer 17 and connected by a rounded portion 52 engaged under the head of the rivet 45.

Reference will now be made to FIGS. 16 to 18, in which the device causing backward movement of the plate 14 in the de-clutched position comprises a piano wire 63 having two limbs 64 intended to be engaged behind the washer 17, and a loop 65 intended to be engaged round a boss 66 on the plate 14. In the boss 66 is formed a groove 67, in which is embedded the piano wire 63, and which ensures an excellent retention of the latter in position, in spite of the external forces produced during operation, and especially centrifugal force.

As a further alternative (FIGS. 19 and 20), the device for moving the plate 14 back in the de-clutched position comprises a member 68 in the form of a star with four bent-back arms. One of the arms 69 is intended to be engaged in a groove 70 of the plate 14. An arm 71, opposite to the arm 69, is intended to be engaged behind the washer 17. The two other arms 72 co-operate with projecting portions 73 of the plate 14, serving to receive the thrust of the washer 17. As in the example shown, this projection may consist of a bead interrupted by housings to receive the clip which co-operates with two consecutive projections. They may consist of isolated protuberances engaged by the arms 72 of the clip 68, the edges being then turned back towards the inside. By means of these various feet, the member 68 is held in its correct position under all circumstances.

What I claim is:

1. A clutch comprising, in combination, a driving shaft and a driven shaft, a driving plate keyed on said driving shaft and an annular pressure-plate fast for rotation with said driving plate and adapted for axial displacement with respect to said driving plate, at least one friction-disc fast for rotation with said driven shaft and normally gripped between frictional annular areas of said driving plate and said pressure-plate, an annular closure cover fixed by its periphery on one of said plates and covering the other said plate, a conical elastic washer interposed between said cover and one of said plates, said washer being pivoted on said cover at points located on a circle intermediate between the edges of said washer, means for supporting the outer edge of said washer on one of said plates, radial slots formed in the lower edge of said washer so as to form a plurality of operating fingers, a de-clutching ring engaging the lower edge of said washer, thrust-actuated means for axially displacing said de-clutching ring, said pressure plate having beyond the outer contour of the frictional area thereof at least three radially projecting feet substantially coplanar with said pressure plate, at least three flexible tangentially-directed connecting flat coplanar tongues coupling said pressure-plate to said cover, each of said tongues being fixed at one extremity to one of said pressure-plate feet and at the other extremity to said cover, the extremities of said connecting tongues located in front with respect to the normal forward direction of rotation being fixed to said cover and the rear extremities of said tongues being fixed to said pressure-plate feet, said tongues being disposed on the side of said feet towards said driving plate so as to extend substantially in the plane of said friction-disc.

2. A clutch as claimed in claim 1, in which each said connecting tongue is duplicated on its side towards the driving plate by an auxiliary elastic tongue, the front extremity of each auxiliary tongue being fixed to the front extremity of each connecting tongue, while the rear extermity of said auxiliary tongue is freely applied against the rear portion of said connecting tongue in order to apply on said latter tongue a force tending to bring it closer axially to said closure cover.

3. A clutch as claimed in claim 1, in which the travel of said connecting tongues in a direction parallel to the axis of the clutch is limited in both directions by abutments.

4. A clutch as claimed in claim 2, in which the rear extremity of each said auxiliary tongue is formed with two extensions engaging on each side of a projection member fast with said pressure plate.

5. A clutch as claimed in claim 4, in which said extensions are joined to each other at the rear of said projection member.

6. A clutch as claimed in claim 1, in which one of the two members coupled together by said connecting tongues comprises a single articulation point for said tongues while the other said member comprises two possible pionts of attachment.

7. A clutch as claimed in claim 6, in which said two points of attachment are symmetrical with each other with respect to a plane passing through the axis and the common point of articulation, so as to permit orientation of said connecting tongues during assembly to take account of the direction of rotation of said driving shaft.

8. A clutch as claimed in claim 6, and comprising two sets of connecting tongues orientated in opposite directions.

9. A clutch as claimed in claim 8, in which at least one of said two sets of connecting tongues have a mounting presenting a slight play.

10. A clutch comprising in combination, a driving shaft and a driven shaft, a driving plate keyed on said driving shaft and an annular pressure plate fast for rotation with said driving plate and adapted for axial displacement with respect to said driving plate, at least one friction disc fast for rotation with said driven shaft and normally gripped between frictional annular areas of said driving plate and said pressure-plate, an annular closure cover fixed by its periphery on one of said plates and covering the other said plate, a conical elastic washer interposed between said cover and one of said plates, said washer being pivoted on said cover at points located on a circle intermediate between the edges of said washer, means for supporting the outer edge of said washer on one of said plates, radial slots formed in the lower edge of said washer so as to form a plurality of operating fingers, a declutching ring engaging the lower edge of said washer, thrust-actuated means for axially displacing said declutching ring, said pressure plate having beyond the outer contour of the frictional area thereof at least three radially projecting feet substantially coplanar with said pressure plate, at least three flexible tangentially-directed connecting flat coplanar tongues coupling said pressure-plate to said cover, each of said tongues being fixed at one extremity to one of said pressure-plate feet and at the other extremity to said cover, the extremities of said connecting tongues located in front with respect to the normal forward direction of rotation being fixed to said cover and the rear extremities of said tongues being fixed to said pressure-plate feet, said tongues being disposed on the side of said feet towards said driving plate so as to extend substantially in the plane of said friction-disc, said pressure-plate feet and said cover having two separate series of rivet holes serving respectively for the fixing of said connecting tongues, whereby said clutch can be adapted for either direction of rotation of said driving shaft without special machining.

11. A clutch as claimed in claim 10, further comprising return coupling means between said washer and said pressure-plate feet for axially moving said pressure plate upon return movement of the washer periphery, wherein the rivet holes of one of said series provided on said pressure-plate feet and unemployed for driving said pressure plate are utilized for fixing said return coupling means with said feet.

12. A clutch as claimed in claim 11 wherein said return coupling means comprise a plurality of blades having flat portions engaging said pressure-plate feet and handle portions engaging said washer, said pressure plate having ventilation passages located opposite said blades.

References Cited in the file of this patent

UNITED STATES PATENTS

| | | |
|---|---|---|
| 1,944,337 | Wemp | Jan. 23, 1934 |
| 2,256,714 | Hunt | Sept. 23, 1941 |
| 2,277,221 | Gamble | Mar. 24, 1942 |
| 2,765,060 | Stenger | Oct. 2, 1956 |
| 2,813,607 | Haussermann | Nov. 19, 1957 |
| 2,905,119 | Bono | Sept. 22, 1959 |

FOREIGN PATENTS

| | | |
|---|---|---|
| 491,770 | Great Britain | Sept. 8, 1938 |